(No Model.)
E. P. NEWMAN.
VEHICLE HUB.
No. 276,706. Patented May 1, 1883.
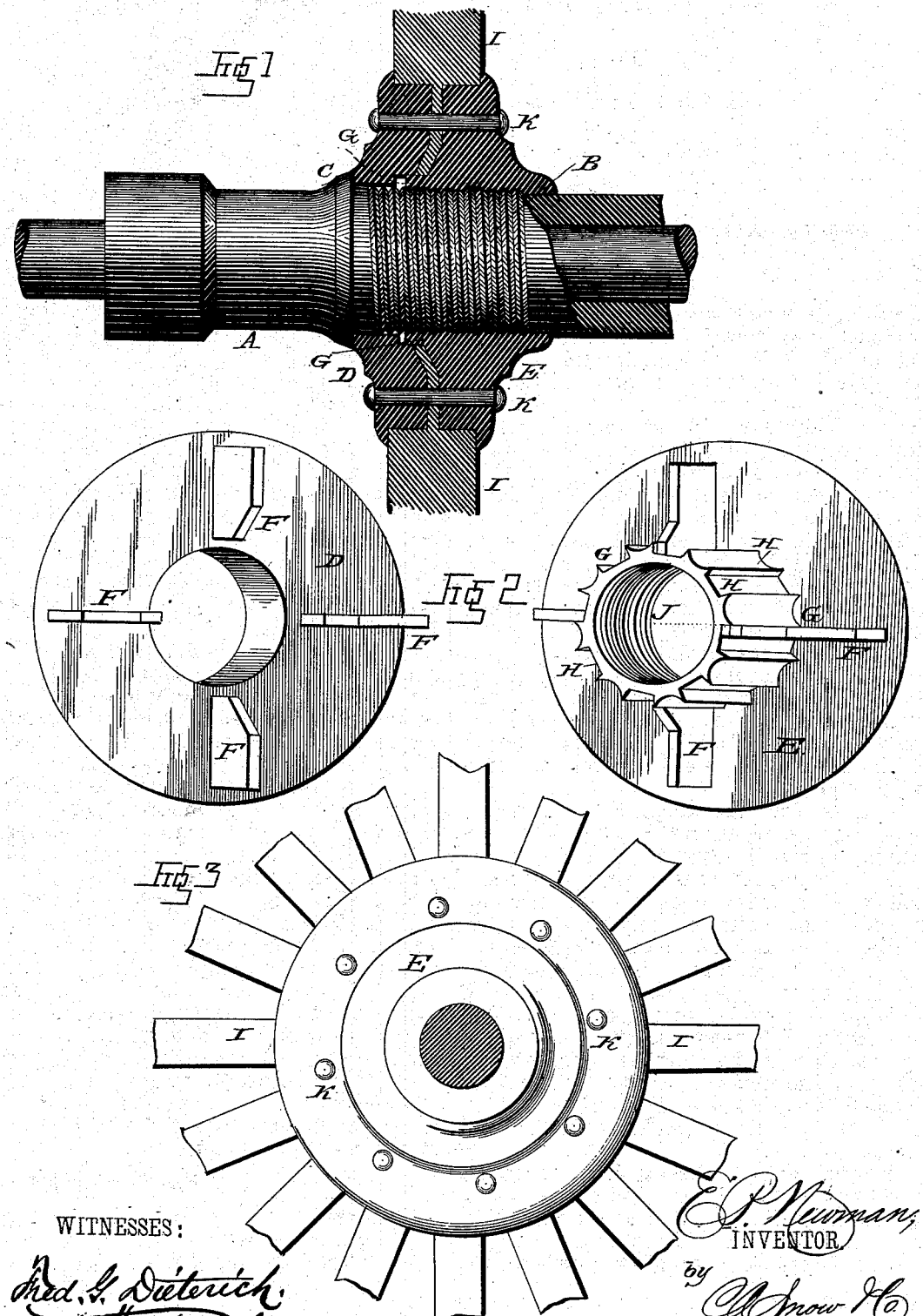
WITNESSES:
Fred. G. Dieterich
Jno. G. Hinkel
E. P. Newman,
INVENTOR
by
U. Snow & Co.
ATTORNEYS.
N. PETERS. Photo-Lithographer. Washington, D. C.

UNITED STATES PATENT OFFICE.

ELMER P. NEWMAN, OF DIMONDALE, MICHIGAN.

VEHICLE-HUB.

SPECIFICATION forming part of Letters Patent No. 276,706, dated May 1, 1883.

Application filed January 29, 1883. (No model.)

*To all whom it may concern:*

Be it known that I, ELMER P. NEWMAN, a citizen of the United States, residing at Dimondale, in the county of Eaton and State of Michigan, have invented a new and useful Hub for Vehicle-Wheels, of which the following is a specification, reference being had to the accompanying drawings.

This invention relates to hubs for vehicle-wheels; and it consists in certain improvements in the construction of the same, having for their object to provide a simple, neat, durable, and inexpensive hub, all as will be hereinafter more fully described, and particularly pointed out in the claims.

In the drawings hereto annexed, Figure 1 is a vertical sectional view of my improved hub, taken longitudinally through the axle-box. Fig. 2 is a detail view, in perspective, of the collars detached; and Fig. 3 is a side view.

The same letters refer to the same parts in all the figures.

A in the drawings designates the axle-box, which has a screw-threaded section, B, and an annular flange, C, near its inner end.

The hub proper consists of two plates or collars, D E, fitting upon the axle-box, and provided each with four equidistant radial flanges or braces, F, of substantially the shape shown in the drawings. The outer collar, E, also has an inwardly-projecting annular ring or flange, G, provided with a series of sockets or mortises, H, to receive the inner ends of the spokes, which in the drawings are denoted by letter I. The inside of the collar E and its flange G is screw-threaded, as shown at J, so as to fit upon the screw-threaded portion of the axle-box.

In constructing a wheel with my improved hub I proceed as follows: Every other spoke is first inserted into alternate mortises H in the ring G, (which said mortises, as will be seen in the drawings, are square, while the intermediate ones are rounded,) and having been thus inserted are held in place, temporarily, by a circular press of suitable construction. The remaining spokes are then glued and driven into place, where they are held securely by the press referred to. The inner collar, D, is then driven or pressed into place, as shown, and secured by means of bolts or rivets K. The felly is then placed upon the wheel, after which said wheel is placed in a suitable lathe and the collar E, with its ring G, bored and internally threaded so as to be true with the felly or rim of the wheel. The axle-box is then screwed into place, after which the wheel is complete and ready for use.

My improved hub is simple in construction and inexpensive. It is neat and durable, and the axle-box, if broken, injured, or worn, can be readily removed and a new one substituted.

I claim as my invention and desire to secure by Letters Patent of the United States—

1. In a vehicle-hub, the herein-described band or collar, having an inwardly-projecting internally-threaded ring provided with sockets or mortises to receive the inner ends of the spokes, substantially as set forth.

2. In a vehicle-hub, the combination of the axle-box having an externally-threaded section and an annular flange near its inner end, the inner band or collar having radial flanges, the outer band or collar having radial flanges and provided with an internally-threaded ring having sockets or mortises to receive the inner ends of the spokes, and the fastening bolts or rivets, substantially as herein set forth.

In testimony that I claim the foregoing as my own I have hereto affixed my signature in presence of two witnesses.

ELMER P. NEWMAN.

Witnesses:
JOHN A. ROSE,
ANDREW J. LANE.